Feb. 25, 1930.    J. J. FENTRESS    1,748,873
DEVICE FOR RAISING SUNKEN VESSELS
Filed March 11, 1929    2 Sheets-Sheet 1
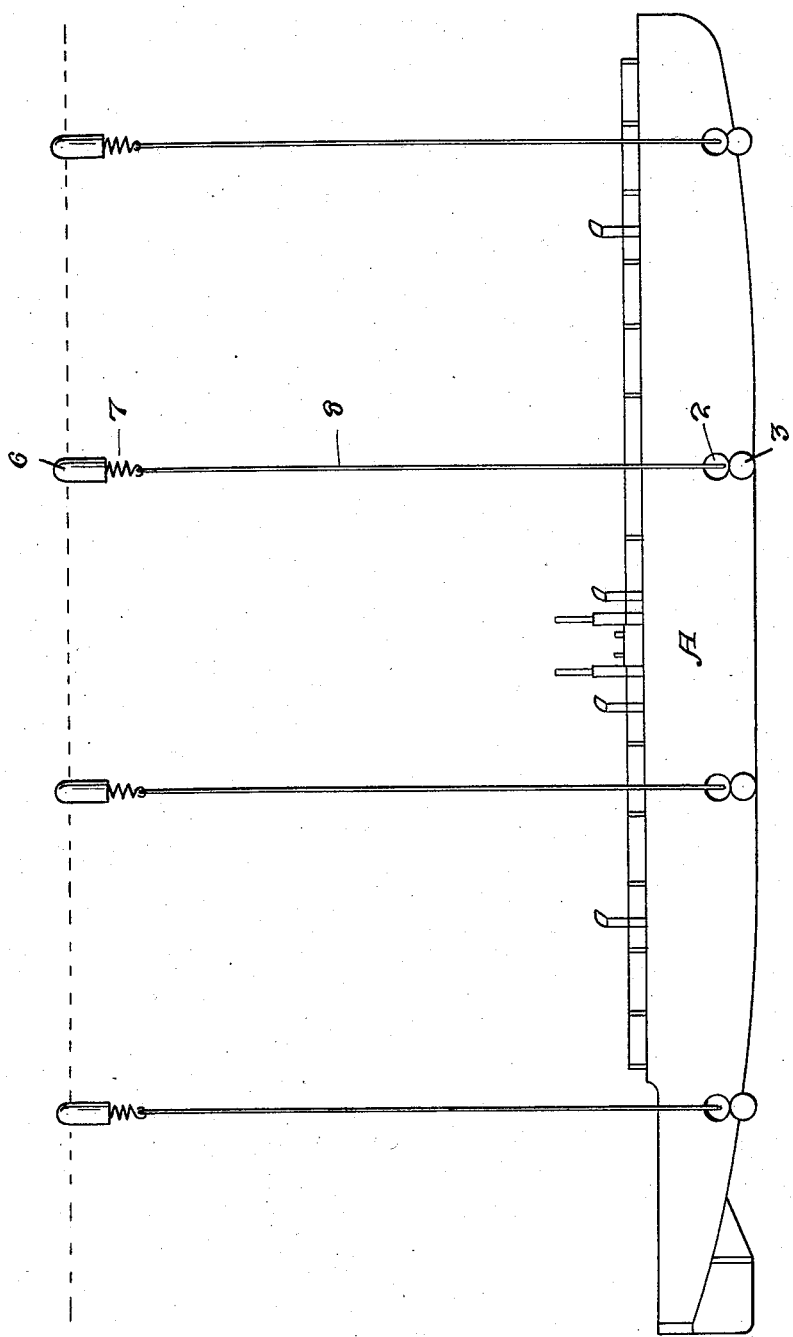
J. J. Fentress    INVENTOR
BY *Victor J. Evans*
ATTORNEY

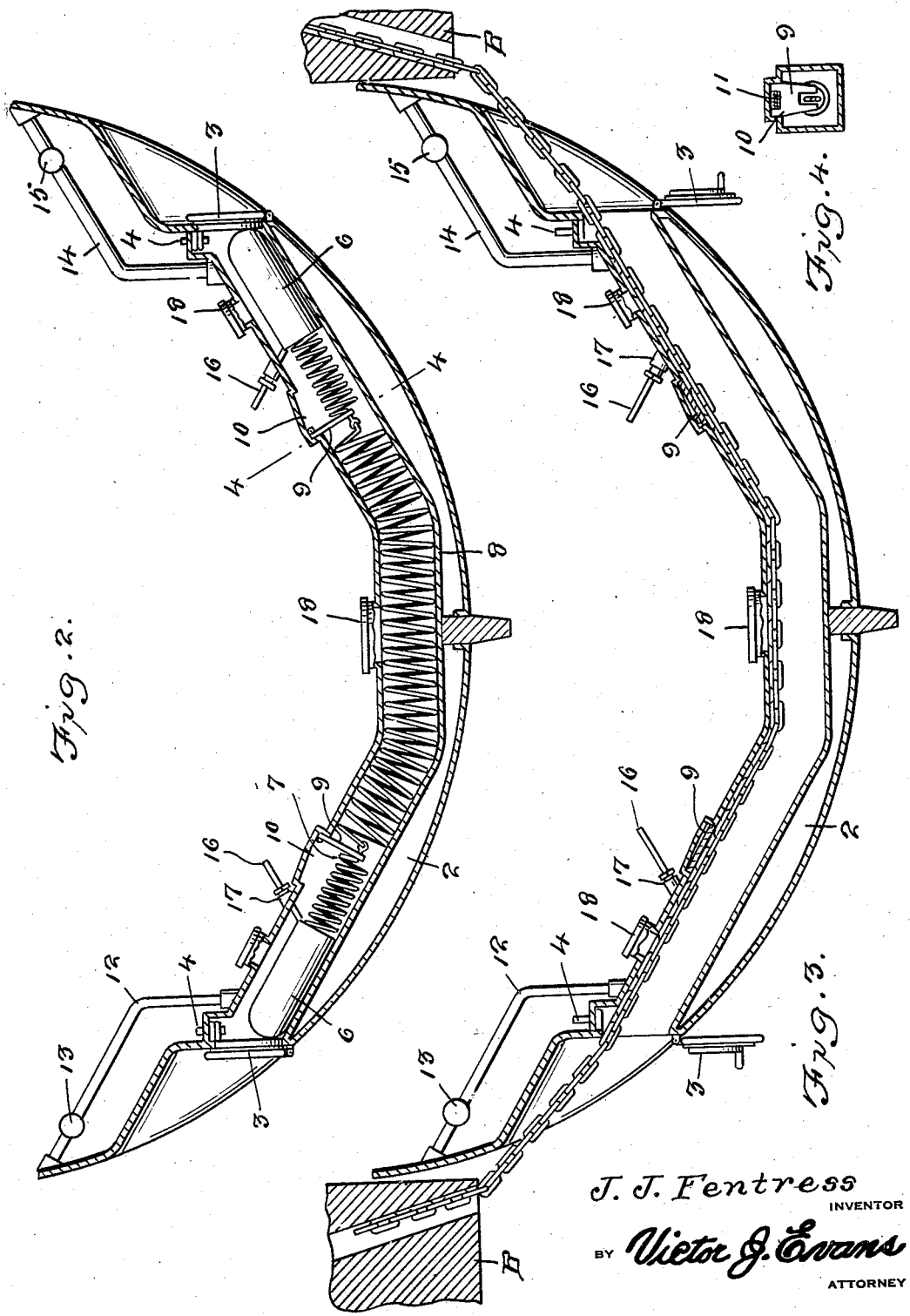

Patented Feb. 25, 1930

1,748,873

UNITED STATES PATENT OFFICE

JOHN J. FENTRESS, OF NORFOLK, VIRGINIA

DEVICE FOR RAISING SUNKEN VESSELS

Application filed March 11, 1929. Serial No. 346,146.

This invention relates to means for facilitating the raising of submarines and other sunken vessels, the general object of the invention being to provide a plurality of passages in the lower part of the hull of the vessel, which open out at the sides of the hull, with doors for closing the passages and each passage containing a pair of buoys connected together by a cable, whereby if the vessel should sink, the doors can be opened so that the buoys will float to the surface carrying the ends of the cables with them so that the cables can be used to pass chains through the passages to permit the vessel to be raised in the same manner as a vessel is raised by chains passing under the bottom thereof.

A further object of the invention is to provide spring means for ejecting the buoys from the passages and to provide means for admitting water to the passages before the doors are opened.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a view showing a sunken vessel, with the buoys at the surface of the water and the cables passing through the passages.

Figure 2 is a sectional view through a portion of the hull of the vessel and through one of the passages.

Figure 3 is a similar view, but showing the doors open and a chain passing through the passage.

Figure 4 is a section on line 4—4 of Figure 2.

As shown in these views, the vessel A is provided with a plurality of passages 2 which pass transversely through the bottom portion of the hull of the vessel, with their ends opening out through the sides of the hull, the ends of the passages being adapted to be closed by the doors 3 which are held in closed position by the latches 4. A float or buoy 6 is arranged in each end of each passage and a spring 7 is connected with the inner end of each buoy. A cable 8 has its ends connected with the inner ends of the springs, this cable being coiled in the passage, as shown in Figure 2. I prefer to make the outer ends of the buoys rounded so as to facilitate their passage, in a vertical position, through the water.

A forked member 9 is pivoted in a recess 10 formed in the upper part of each passage an appreciable distance from each end thereof, this recess being large enough to receive the member 9 when the same is forced upwardly by its spring hinge 11. This member is adapted to be moved downwardly so as to form an abutment for the rear end of each spring, whereby the spring will be held compressed when the buoy or float is in the passage, as shown in Figure 2. A soon as the latch 4 is moved to releasing position, the spring will project the buoy or float forwardly so as to open the door and cause the float to leave the passage. Each float of each passage will, therefore, rise through the water, and thus the cable will be drawn out, though the central portion of the cable will remain in the passage.

The crew of the rescue ship can then attach a heavier cable or chain to one end of the cable and by pulling upon the other end, will pull the heavier cable through the passage. Still heavier cables can be passed through the passage until a cable heavy enough to lift the ship has been put in place. Then the pontoons B are sunk into position at the sides of the ship, with the chains suitably connected thereto, so that when water is pumped from the pontoons, they will lift the ship through the chains passing through the passages. A pipe 12 is connected with one end of each passage and this pipe passes through one side of the hole in the vessel and is provided with a valve 13. A larger pipe 14 connects the other end of the passage with the exterior of the vessel and contains a valve 15. Thus by opening the two valves, sea water will enter each passage through the pipe 14 and air will escape through the pipe 12. This admission of sea water to the passage will enable the doors 3 to be opened against the pressure of the water outside of the vessel. If the buoys or floats should fail to pass from the passages, they may be forced therefrom by means of the rods 16 passing through the glands 17 into each end of the passage, as these rods can be used to push the floats from the passages. A plurality of manholes 18 provides access to the passages from the interior of the ship, so that the passages can be cleaned or the parts repaired.

From the foregoing it will be seen that I have provided simple means whereby a sunken vessel can release buoys so as to not only mark its position, but also enable the rescue vessel to easily and quickly pass chains under the sunken vessel to raise the same, and this can be done without floating or otherwise damaging the sunken vessel.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a vessel having a plurality of transversely arranged passages in the lower part of its hull with their ends opening out through the sides of the hull, doors for closing the ends of the passages, a float in each end of each passage, a cable in each passage connected with the two floats, spring means for ejecting the floats, latch means operable from inside the vessel for holding the doors closed against the pressure of the spring pressed floats, means whereby sea water can be admitted to each passage before the doors are opened and manually operated means for pushing the floats from the passages if the springs should fail to eject the floats therefrom.

In testimony whereof I affix my signature.

JOHN J. FENTRESS.